July 3, 1962     A. L. STUCHBERY     3,041,718

MANUFACTURE OF ALUMINIUM CONTAINERS

Filed Sept. 26, 1958

Inventor
Arthur Leslie Stuchbery.
By Mason, Porter, Diller & Stewart
Attorney

United States Patent Office 3,041,718
Patented July 3, 1962

3,041,718
MANUFACTURE OF ALUMINIUM CONTAINERS
Arthur Leslie Stuchbery, Enfield, England, assignor to The Metal Box Company Limited, London, England, a British company
Filed Sept. 26, 1958, Ser. No. 763,527
Claims priority, application Great Britain Oct. 18, 1957
5 Claims. (Cl. 29—470)

This invention relates to the manufacture of aluminium containers.

A well known process of manufacturing thin-walled containers of aluminium is that effected on the basic principles of cold extrusion. This method requires the employment of very high impact pressures for the extruding plunger to obtain the requisite impact load applied to a metal disc located in a press die in which extrusion is effected, and a press stroke appropriate to the height of the container to be produced. The method always results in an extruded container having a bottom the thickness of which is greater than that of the wall, unless the wall thickness is disproportionately thick.

To overcome this feature it has been proposed to manufacture tubes of aluminium by extrusion from suitable flat rings of the metal and, after extrusion of a tube and removal thereof from the die, to attach a thin bottom to the flanged bottom edge produced on the tube as a result of the extrusion operation.

A main object of the present invention is to produce solely by extrusion a thin-walled aluminium container of which the bottom is of substantially the same thickness as the wall, and to effect extrusion of the container by the use of a press load which is less than that required to extrude from a disc or slug a container having a wall of like thickness.

A method of manufacturing a container having an extruded wall of aluminium in accordance with the invention is characterised by the fact that the extrusion is effected on a flat ring of aluminium so that the wall terminates at the lower end in a flange, the integral bottom of the container being simultaneously produced from a bottom-forming disc of aluminium on which the ring is seated for the extruding operation.

The invention further contemplates a method of manufacturing an aluminium container which consists of integrating a bottom-forming aluminium disc with a flat aluminium ring and forming the container wall by extrusion of the ring seated on the disc.

Preferably the disc employed for forming the bottom of the container is of higher specific hardness than the ring to ensure preferential flow of the wall from the ring.

In normal extrusion processes it is customary to anneal (soften) the discs or slugs from which the container is formed just prior to extrusion so that the specific hardness is as low as possible. The discs or slugs are blanked out from plates of aluminium produced by rolling out billets of the metal and in the processes of rolling and blanking the aluminium becomes considerably work hardened hence the discs or slugs produced are of tempered metal and these tough discs or slugs are softened by annealing. By employing in accordance with the present invention a disc from which the bottom of the container is formed of higher specific hardness than that of a blanked or extruded ring from which the wall of the container is produced, the pressure exerted by the plunger when impacting on the assembly of ring and disc causes a preferential flow of the ring to form the wall and a cold welding of the base of the ring to the disc which is to form the the bottom of the container. The original aluminium plate from which the ring or discs are blanked is obtainable in the open market in at least three degrees of hardness, viz. a soft plate, half-hard plate, and hard plate. The soft plate is an annealed rolled plate (usually thin gauge), the half-hard a plate which is annealed before rolling is completed so that the half-hardness is obtained, and the hard plate is rolled to the desired thickness and no annealing whatever effected.

Accordingly in carrying out the present invention the annealing of the ring from which the walls of the container are to be formed is of a greater degree than that effected in the disc which is to form the bottom of the container, in order that there is a hindrance to flow in the disc as compared with the flow immediately initiated from the ring as a consequence of the impact pressure applied in the press to the assembled ring and disc. Alternatively, the difference of specific hardness between the ring and the disc can be obtained by using for the disc a material which is less pure than that used for the ring.

The manufacture in accordance with the invention may be achieved by first securing the ring to the disc, e.g. by cold welding, to form a unit for extrusion.

In order to inhibit the formation of oxides in the region of the aluminium ring which is to be welded to the disc during extrusion of the ring the association of the two is effected as quickly as possible after formation of the ring and from this aspect a method of manufacturing a container having an extruded wall of aluminium according to the invention conveniently comprises the steps of extruding an aluminium tube having a wall thickness equal to the width of the annulus of the ring, separating from the tube a ring of the desired thickness, immediately feeding the ring to an extruding press and associating said ring with a container bottom-forming disc, and effecting the above-mentioned movement of the ring and disc through the die.

The blanking press for the disc may have means for feeding the discs to the extruding press, said means operating synchronously with the feed of the rings so that the discs and rings are fed alternately to the extruding press and in synchronism with the retraction of the impacting plunger. Feeding of the discs and ring may be effected through tunnels having hinged closure flaps at the entry and exit ends to inhibit oxidation, and an inert gas can be ducted into the tunnels to further protect the aluminium rings and discs against oxidation as it is desirable when effecting the cold welding to preclude any oxidised metal from the welding plane.

In order that the invention may be more clearly understood one embodiment thereof will now be described, by way of example, with reference to the accompanying diagrammatic drawings, in which.

In the drawings like references designate similar parts.

Figure 1:
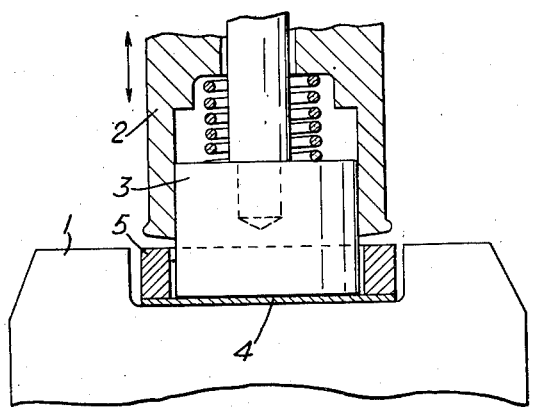
FIG. 1 is an elevation partly in section of an extruding press die.

Referring to FIG. 1, the lower die of an extrusion press tool is indicated at 1 and the impacting plunger at 2. The plunger is a hollow member and houses a spring pressed ram 3 located within the plunger to rise and fall therewith.

Figure 2:
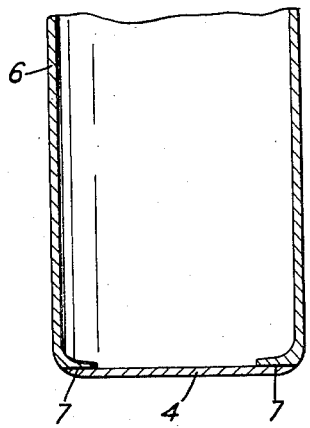
FIG. 2 illustrates a container produced when operating the press die in accordance with the invention.

According to the present invention, feeding means, not shown, of known form are adapted to feed to the press a container bottom-forming disc 4 and a ring 5, both of aluminium. The ring is superimposed on the disc and downward movement of the ram and plunger ensures first a resilient holding down of the disc 4 on the bed of the die and then the impact of the ring which produces the thin wall 6, FIG. 2, of the container by extrusion and the uniting of the wall 6 and the disc 4 which is to form the bottom of the container as a result of the cold welding, as indicated at 7, effected during extrusion of the ring 5. As can be seen from FIG. 2, the wall 6 terminates at the lower end in a flange to which the container bottom-forming disc is integrated.

The container bottom-forming disc 4 has a specific hardness which is higher than that of the ring 5 so that the impact on the ring tends to effect flow of the wall 6 from the ring in preference to flow of the disc. Thus the ring 5 will extrude at a lower yield point than the yield point of the disc 4. The ring is preferably of a specific hardness which is as low as possible, e.g. formed from fully annealed rolled plate, and the disc is more soft than that of a plate of half-hardness but has a specific hardness greater than that of the ring, to achieve during extrusion a preferential flow from the ring rather than from the disc so that excessive thinning of the disc is avoided.

By the present invention there is provided a container having a thin extruded wall and a bottom of substantially the same thickness, and the container can be formed by lighter press loads than those required to effect extrusion of a container having a wall of like thickness from a solid disc or slug.

In one embodiment of the invention an aluminium tube is extruded in known manner to have a wall the thickness of which is equal to the width of the annulus of the ring 5, and shearing means is provided, also in known manner, to shear from the tube a ring 5 having a thickness depending on the height and wall thickness of the container to be produced. A ring 5 severed from the tube is immediately fed, in known manner, to the extruding press tool from one side thereof. Prior to the delivery of the ring to the press tool a disc 4 is fed thereto, in known manner from a blanking machine. The feeding of the disc and ring to the press tool is effected in synchronism with the retraction of the plunger 2 of the extruding press tool.

If desired, instead of the ring and disc being fed separately to the extruding press tool and associated one with the other on the lower die of the press tool, the disc may be secured to the ring, for example by welding, to form a unit for extrusion when introduced into the extruding press tool.

I claim:

1. A method of manufacturing a metal container comprising the steps of seating a metal bottom-forming disc in a die, loosely seating a metal ring of a metal similar to but softer than said bottom-forming disc on the bottom-forming disc in alignment therewith, applying a downward force on the metal ring with a punch while confining the metal ring against inward flow with the metal of the metal ring flowing upwardly around the punch while being confined by the die to form a container wall together with the simultaneous pressure bonding of the lower end of the container wall to the bottom-forming disc to integrally connect the bottom-forming disc and the container wall.

2. A method of manufacturing an aluminum container comprising the steps of seating an aluminum bottom-forming disc in a die, loosely seating an aluminum ring which is of a softer metal than said bottom-forming disc on the bottom-forming disc in alignment therewith, applying a downward force on the aluminum ring with a punch while confining the aluminum ring against inward flow with the metal of the aluminum ring flowing upwardly around the punch while being confined by the die to form a container wall together with the simultaneous pressure bonding of the lower end of the container wall to the bottom-forming disc to integrally connect the bottom-forming disc and the container wall.

3. A method of manufacturing an aluminum container comprising the steps of seating an aluminum bottom-forming disc in a die, loosely seating an aluminum ring which is of a softer metal than said bottom-forming disc on the bottom-forming disc in alignment therewith, applying a downward force on the aluminum ring with a punch while confining the aluminum ring against inward flow with the metal of the aluminum ring flowing upwardly around the punch while being confined by the die to form a container wall which terminates at the lower end thereof in a flange integrated with the bottom-forming disc simultaneous with the flowing of the metal of the ring.

4. A method of manufacturing an aluminum container comprising the steps of seating an aluminum bottom-forming disc in a die, the thickness of the bottom-forming disc being generally that of the container, loosely seating an aluminum ring which is of a softer metal than said bottom-forming disc on the bottom-forming disc in alignment therewith, applying a downward force on the aluminum ring with a punch while confining the aluminum ring against inward flow with the metal of the aluminum ring flowing upwardly around the punch while being confined by the die to form a container wall the thickness of which is the same as that of the bottom-forming disc, together with the simultaneous pressure bonding of the lower end of the container wall to the bottom-forming disc to integrally connect the bottom-forming disc and the container wall.

5. A method of manufacturing an aluminum container comprising the steps of seating an aluminum bottom-forming disc in a die, extruding a soft aluminum tube as compared to the bottom-forming disc, severing from the tube a ring, immediately loosely seating the disc on the bottom-forming disc in alignment therewith, applying a downward force on the aluminum ring with a punch while confining the aluminum ring against inward flow with the metal of the aluminum ring flowing upwardly around the punch while being confined by the die to form a container wall together with the simultaneous pressure bonding of the lower end of the container wall to the bottom-forming disc to integrally connect the bottom-forming disc and the container wall.

References Cited in the file of this patent

UNITED STATES PATENTS

| | | |
|---|---|---|
| 731,100 | Dick | June 16, 1903 |
| 1,776,855 | Holmes | Sept. 30, 1930 |
| 1,848,083 | Wetherald | Mar. 1, 1932 |
| 2,120,595 | Ash | June 14, 1938 |
| 2,471,936 | Colwell | May 31, 1949 |
| 2,608,887 | Sowter | Sept. 2, 1952 |
| 2,703,997 | Sowter | Mar. 15, 1955 |
| 2,703,998 | Sowter | Mar. 15, 1955 |
| 2,739,369 | Cooney | Mar. 27, 1956 |
| 2,759,629 | Sokoloff | Aug. 21, 1956 |
| 2,778,494 | Kreidler | Jan. 22, 1957 |
| 2,849,148 | Lohuis | Aug. 26, 1958 |
| 2,908,073 | Dulin | Oct. 13, 1959 |

FOREIGN PATENTS

| | | |
|---|---|---|
| 553,819 | Great Britain | June 7, 1943 |
| 714,888 | Great Britain | Sept. 1, 1954 |
| 751,125 | Great Britain | June 27, 1956 |